INVENTORS
JEROME SVIGALS
IRVING C. LIGGETT

BY Richard C Cummins

ATTORNEY

INFORMATION COMPRESSION AND EXPANSION SYSTEM

Filed Aug. 13, 1958

4 Sheets-Sheet 2

United States Patent Office 3,064,239
Patented Nov. 13, 1962

3,064,239

INFORMATION COMPRESSION AND EXPANSION SYSTEM

Jerome Svigals, Encino, Calif., and Irving C. Liggett, North Tarrytown, N.Y., assignors to International Business Machines Corporation, New York, N.Y., a corporation of New York Filed Aug. 13, 1958, Ser. No. 754,789
8 Claims. (Cl. 340—172.5)

This invention relates in general to data processing systems and in particular to an improved data compression and expansion system.

In data processing systems information is usually stored in the form of unit records which comprise a number of fields corresponding to different quantities. The length of any particular field in terms of the number of character positions is usually predetermined by a programmer by anticipating the maximum number of characters required to represent the particular quantity. In many data processing applications the content corresponding to a particular field will not, on the average, require as many characters as those established for its maximum anticipated size. As a result, information stored in a particular field usually contains a number of non-significant characters. For example, if the information is numeric, non-significant characters take the form of zeros to the left of the most significant number, and if the information is alphabetical, the non-significant characters may take the form of blanks to the right of the least significant letter. It will be seen that when information to be processed is stored, for example, on magnetic tape in serial fashion, considerable storage space may be taken up by non-significant information. Data compression and expansion systems are therefore employed to utilize the space available for information storage more economically, compression being the process of eliminating non-significant characters before entering the data into storage, and expansion being the process of replacing the non-significant characters on retrieving the information from storage. Besides increasing utilization of storage capacity, a compression and expansion system can result in a reduction of time required to enter and retrieve information from storage.

Data compression and expansion systems are therefore desirable provided that they do not adversely affect the overall operation of the data processing system. Many of the data compression and expansion systems suggested in the prior art, while increasing utilization of storage capacity, involve rather complex arrangements, require additional steps in programming, and hence increase the time for processing the information.

It has been found in accordance with the present invention that a relatively simple data compression and expansion system may be provided which increases storage utilization capacity without affecting processing time and without requiring additional programming steps and programming effort.

It is therefore an object of the present invention to provide an improved data compression and expansion system.

Another object of the present invention is to provide a data compression and expansion system which operates without being programmed by the data processing system.

A further object of the present invention is to provide a system for eliminating non-significant characters from a data field prior to entering the data in storage.

A still further object of the present invention is to provide a system for replacing non-significant characters in data obtained from a tape unit containing information stored in compressed form.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a diagrammatic view illustrating a data compression system embodying the present invention.

FIG. 1*a* is a block diagram of the compression system shown in FIG. 1.

Figure 5A:
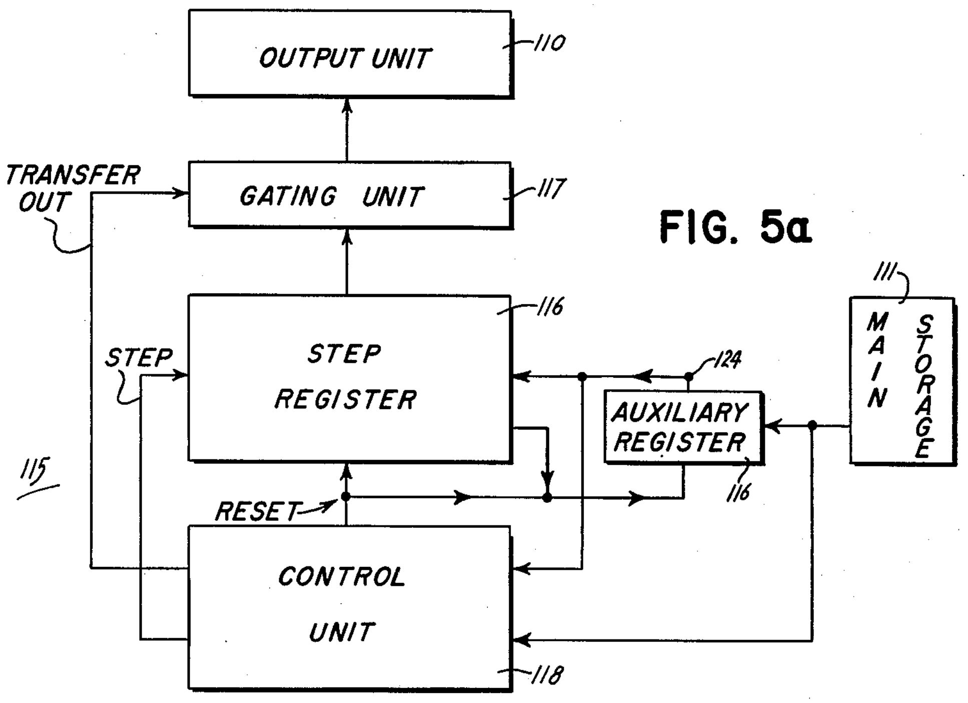
Figure 5:
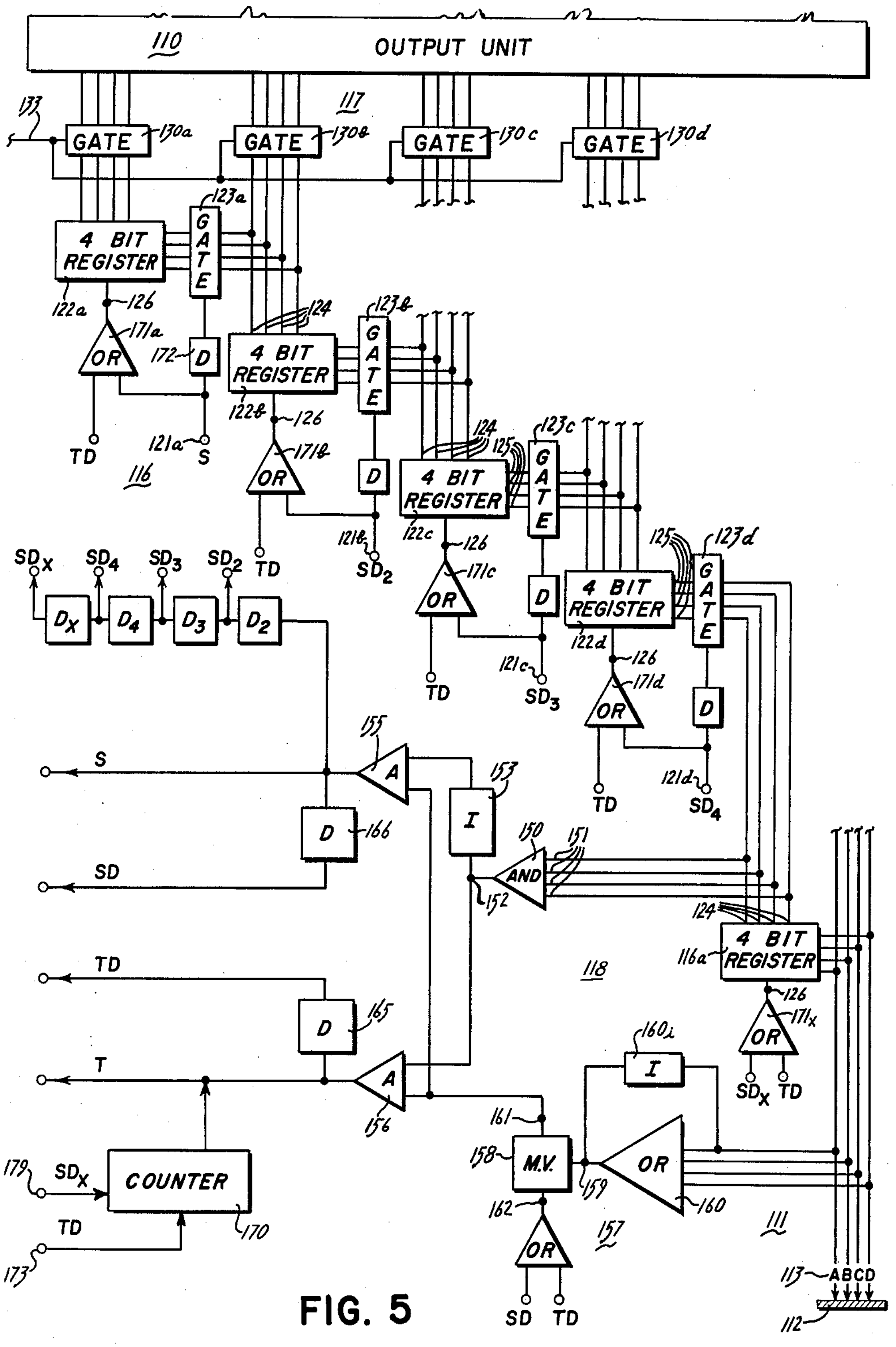

FIGS. 5 and 5*a* are views illustrating a data expansion system embodying the present invention.

Figure 1:
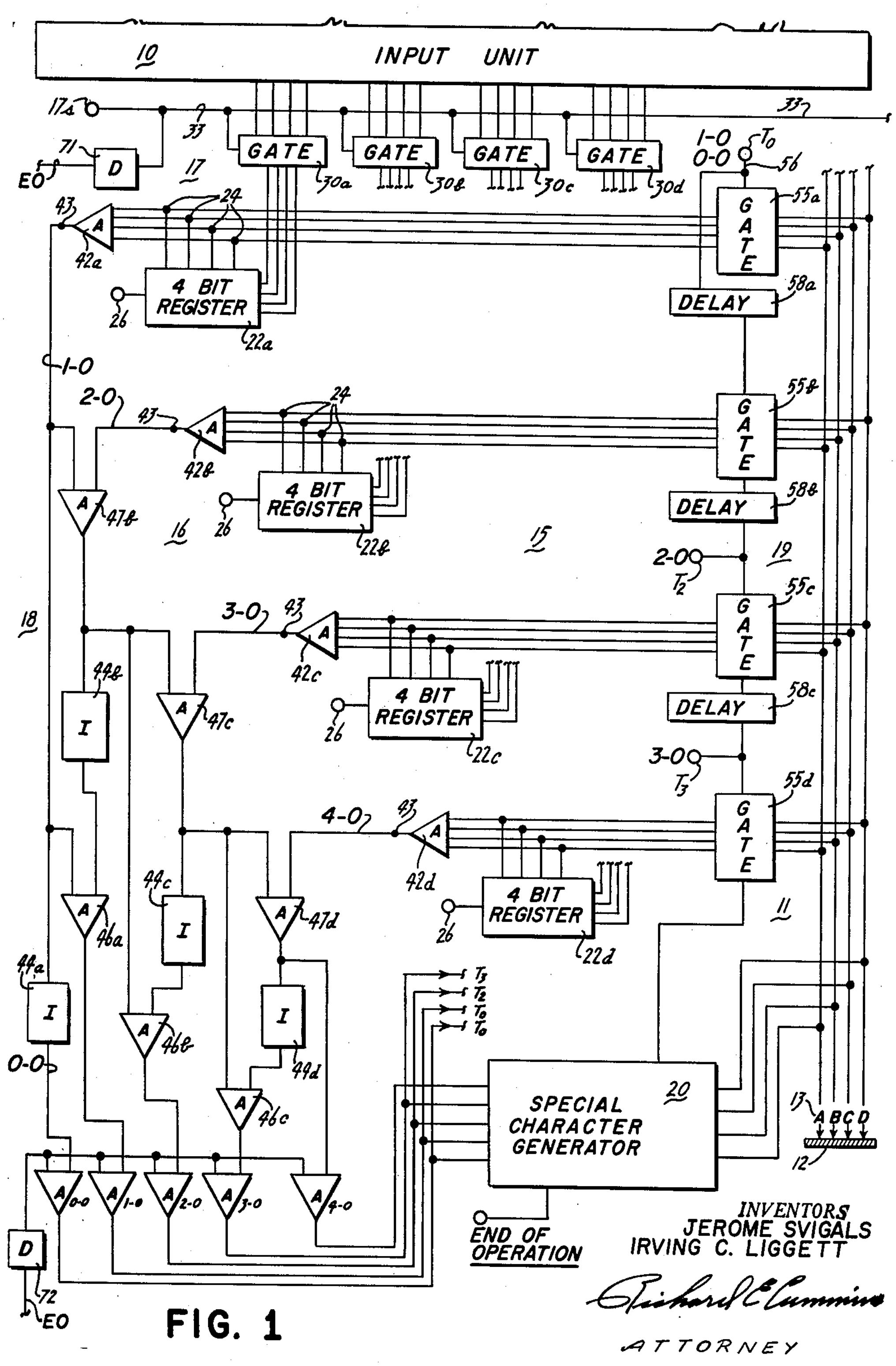
Figure 1A:
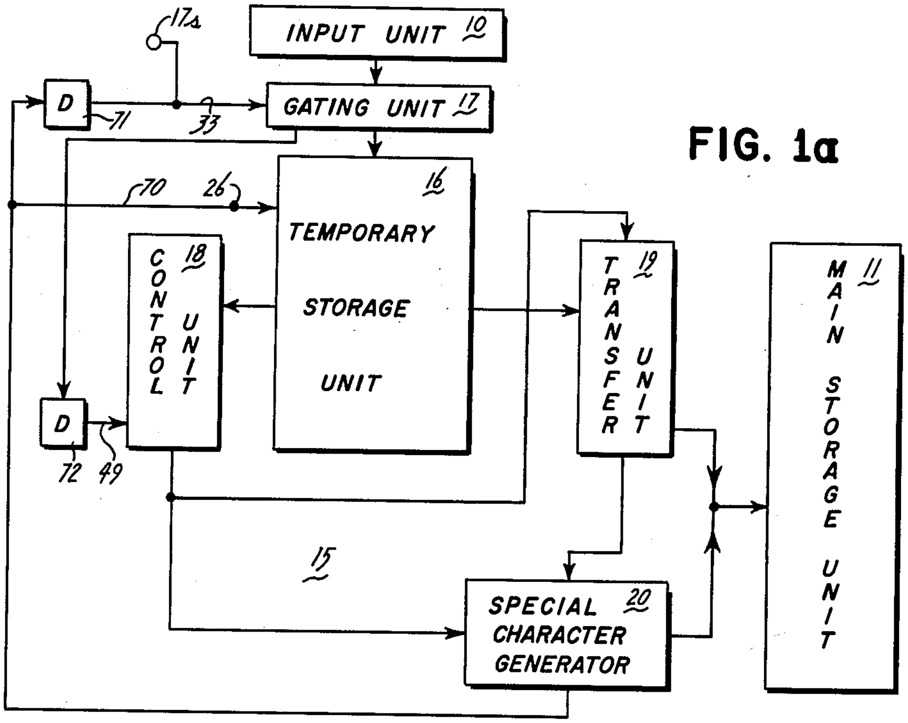

Referring to the drawing and particularly to FIGS. 1 and 1*a*, the system illustrated therein comprises generally an input unit 10 in which information is stored in the form of unit records. Input unit 10 is shown in block diagram since it may take several different forms. For example, it may represent a simple accounting card reader or the internal core matrix memory of a computer. Each of the records stored in unit 10 comprises a predetermined number of data fields. The size of a record and the number of fields in the record are determined by a programmer in accordance with the particular data processing operation to be performed by the system and the capacity of the memory. The system further includes a main data storage unit 11 which is shown in FIG. 1 as a magnetic tape 12 and a plurality of transducers 13. Characters are stored on the tape 12 parallelly by bit and serially by character. For purposes of illustration, only four transducers **13*a* through 13*d*** are shown, and hence it is assumed that each character is defined by a different combination of four binary bits "1" or "0" in accordance with any of the known code arrangements.

In order to store information on the tape 12 in a compressed form, i.e., with non-significant characters removed, a data compression system designated generally by reference character 15 is employed. The function of the compression system 15 is to remove the non-significant characters from the data contained in the various fields of the records of input unit 10 so that only significant characters are recorded on the tape 12. In this connection compression system 15 comprises generally a temporary storage means 16, a gating unit 17 for transferring data contained in a predetermined field to the temporary storage means 16, a control unit 18 for determining the number of non-significant characters present in the transferred data, a transfer unit 19 under control of the control unit 18 for transferring the significant characters to the tape 12, and a generator unit 20 operable in response to a signal from the control unit 18 to transfer a special character to the tape immediately following the least significant character in accordance with the presence of a predetermined number of non-significant characters in the data.

Figure 2:
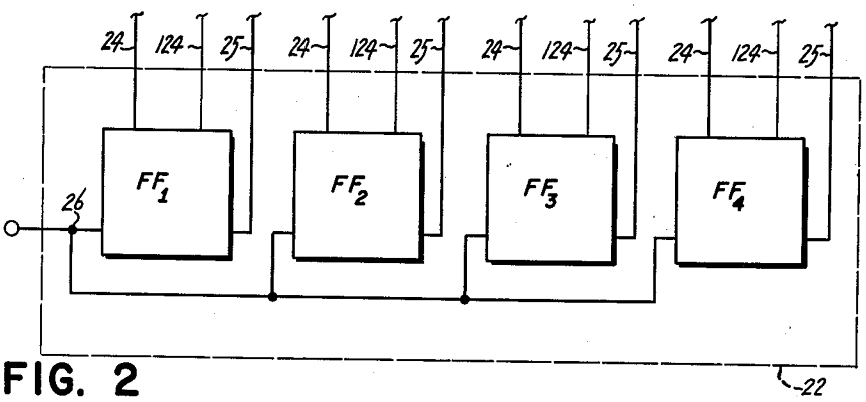
FIG. 2 is a schematic view of a character register shown diagrammatically in FIG. 1.

As shown in FIG. 1, the temporary storage unit 16 comprises a plurality of identical character registers 22, only four such registers **22*a* through 22*d* being illustrated for purposes of explanation. It should be realized that in actual practice many more character registers would be employed. Each character register comprises a plurality of bistable units, depending on the number of bit positions employed to define each character. Since it is assumed that each character is defined by four binary bits, each of the registers comprises four bistable units $FF_1$ through $FF_4$ as shown in FIG. 2. Each unit FF has an output terminal 24, an input terminal 25 and a reset terminal 26. A signal applied to the reset terminal 26 causes the unit FF to be set to a "0" position where the output terminal 24 is high. On the other hand, a signal applied to the input terminal 25 changes the state of the unit FF so that the ouput terminal 24** is low.

Figure 3:
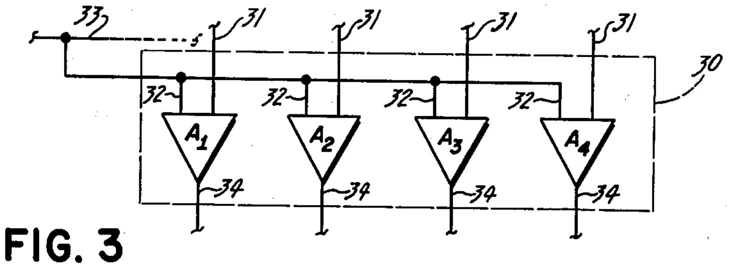
FIG. 3 is a schematic view of a gating unit shown diagrammatically in FIG. 1.

The gating unit 17 for transfering data from the input unit 10 to the temporary storage unit 16 comprises a plurality of gating circuits 30*a* through 30*d*, each of which functions to transfer a character to its associated character register 22. As shown in FIG. 3, each gating circuit 30 comprises a plurality of AND gates $A_1$ through $A_4$. One input terminal 31 of each AND gate is supplied with a signal from the input unit 10 while the other input terminal 32 of each AND gate is connected to an input gating signal line 33. The output tap 34 of each AND gate $A_1$ through $A_4$ is connected to the input terminal 25 of a bistable unit FF in an associated character register 22. A gating signal applied to line 33 therefore operates each of the gating circuits 30*a* through 30*d*, causing each character contained in a predetermined data field to be transferred simultaneously to the associated character register 22.

The control unit 18 for determining the number of non-significant characters contained in the data transferred to the character registers 22 comprises a relatively simple system of logical AND and OR gates which are operated in response to the condition of each character register. If the system is arranged for numerical operation, non-significant characters take the form of zeros to the left of the first non-zero number, and hence the control unit 18 would be arranged to count the number of zeros starting at the left-most character register and provide control signals to the transfer unit 19 for transferring data to tape in accordance with the number of zeros encountered. If the system is arranged to process alphabetical data, non-significant characters take the form of blanks to the right of the least significant character, and hence the control unit would be arranged to count the number of zeros starting at the right-most character register. If the system is arranged to process alphanumeric information, two separate control units which operate in sequence may be provided.

It has been assumed for purposes of explanation that the system is processing numerical information and that the control unit 18, as shown in FIG. 1, is arranged to count the number of zeros starting at the left-most character register 22*a*.

Control unit 18 in this instance includes a four-terminal AND gate 42 associated with each character register 22. The output terminals 24 of the bistable units $FF_1$ through $FF_4$ of the character register 22*a* are connected respectively to the four input terminals of AND gate 42*a*. It is assumed in accordance with the normal convention that decimal zero is represented by four zero bits, and hence the output terminal 24 of each bistable unit FF is in the high state. The presence of decimal zero in register 22*a* therefore provides a signal at the output terminal 43 of the AND gate 42*a*. When a number other than decimal zero is stored in the register 22*a*, at least one of the terminals 24 of bistable units $FF_1$ through $FF_4$ is low, which renders the output terminal 43 of AND gate 42*a* low. AND gates 42*b* through 42*d* and associated registers 22*b* through 22*d* are similarly arranged to provide a signal at their output terminals 43 when decimal zero is represented in the respective registers.

The output signal from AND gate 42*a*, if high, is referred to as the "1–0" signal, while the signals from AND gates 42*b*, 42*c* and 42*d* are referred to respectively as the "2–0", "3–0" and "4–0" signals. A "0–0" signal is obtained when the output of AND gate 42*a* is low by inverting the output in an inverter 44*a*. The "0–0" signal from inverter 44*a* is applied directly to one terminal of an AND gate $A_{0-0}$. The "1–0" signal from AND gate 42*a* is supplied to one terminal of an AND gate $A_{1-0}$ through an AND gate 46*a* provided that the number in register 22*b* is not decimal zero. This control is effected by means of an inverter 44*b* and an AND gate 47*b*. AND gate 47*b* is supplied with the "1–0" signal from register 22*a* through AND gate 42*a* and the signal obtained from register 22*b*. If a number other than zero is stored in register 22*b*, the output of AND gate 47*b* is low and the output of the inverter 44*b* is high. AND gate 46*a* therefore supplies the "1–0" signal to AND gates $A_{1-0}$. If, on the other hand, register 22*b* contains decimal zero, a "2–0" signal is supplied to AND gate 47*b*, which causes its output to be high and the output of the inverter 44*b* to be low. AND gate 46*a* therefore remains closed. The "2–0" signal is supplied to an AND gate $A_{2-0}$ provided that the number in register 22*c* is not zero. This control is effected in a manner similar to that just described by means of an inverter 44*c* and an AND gate 46*b*. If the register 22*c*, however, does contain decimal zero, AND gate 46*b* remains closed and a "3–0" signal is supplied to an AND gate $A_{3-0}$ through an AND gate 46*c* provided that register 22*d* does not contain a decimal zero. If all four registers contain zero, the "4–0" signal is supplied to an AND gate $A_{4-0}$ through an AND gate 47*d*.

It will thus be seen that only one terminal of the output AND gates $A_{0-0}$ through $A_{4-0}$ is high for each word transferred to the temporary storage means 16 and that this terminal corresponds to the number of non-significant characters starting from the left, in this instance zeros, positioned in the registers 22. By applying a gate control pulse to a terminal 49 in a manner to be described later, the correct pulse is supplied to the transfer unit 19.

The transfer unit 19 for transferring significant characters to the tape 12 comprises a plurality of gating units 55*a* through 55*d* similar to those shown in FIG. 3. One unit 55 is connected between each character register 22 and the magnetic transducers 13 of the main storage unit 11. Each gating unit 55 is similar and comprises four AND gates, one terminal of each AND gate being connected to the output terminal 24 of a different bistable unit FF of its associated register 22. The other terminals of the AND gates are connected in parallel to a line 56 which is provided with a plurality of serially connected delay units 58 disposed between each of the gating units 55. Line 56 is also provided with a series of taps $T_0$, $T_2$ and $T_3$. Tap $T_0$ is connected to the output terminal of AND gate $A_{0-0}$ and AND gate $A_{1-0}$ by suitable means omitted in FIG. 1 for reasons of clarity. Taps $T_2$ and $T_3$ are connected respectively to the output terminals of AND gates $A_{2-0}$ and $A_{3-0}$. A control signal from AND gates $A_{0-0}$ or from AND gate $A_{1-0}$, therefore, causes all of the gating units 55*a* through 55*d* to operate in a predetermined time sequence determined by the delay units 58. On the other hand, a signal from AND gate $A_{2-0}$ causes gating units 55*c* and 55*d* to operate, and a signal from AND gate $A_{3-0}$ causes only gating unit 55*d* to operate. It will thus be seen that only significant characters are transferred to the main storage unit 11 from the temporary storage means 16 under control of the control unit 18.

Figure 4:
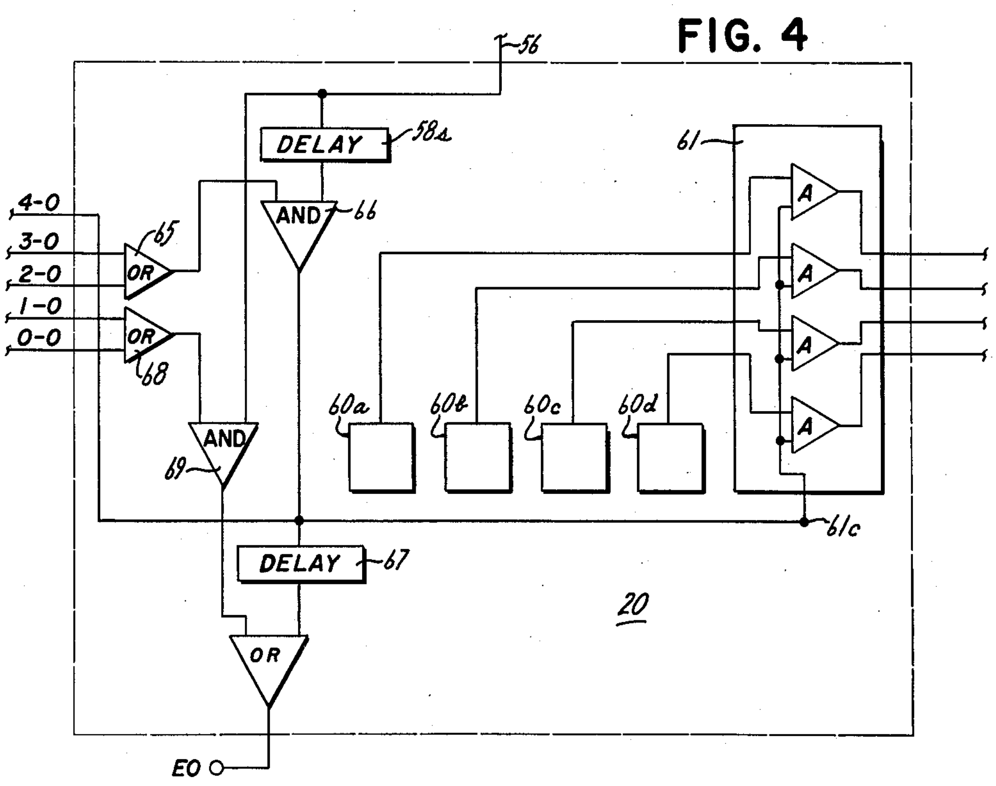
FIG. 4 is a view illustrating the special character generator illustrated in block form in FIGS. 1 and 1*a*.

As mentioned previously, a special character generator 20 is provided for transferring a special character onto tape whenever the data entered into the temporary storage means contains two or more non-significant characters. The special character generator, as shown in block form in FIG. 1, may take several forms, the details of one suggested arrangement being shown in FIG. 4. As shown in FIG. 4, the special character generator 20 comprises four units 60*a* through 60*d* which function to record a special character, defined in this instance by four binary "1's," on the tape 12 immediately following the last significant character which is transferred. The units may be any suitable device for providing a voltage level corresponding to binary "1" to the four input terminals of a gating unit 61 associated with the special character generator. Gating unit 61 is similar to the gating units 30 and 58 represented by the arrangement of the four AND gates shown in FIG. 3. The common terminal 61*c* of the gating unit 61 is supplied with a gate signal to cause the special character to be transferred to tape when the data in the registers 22*a* through 22*d* contains two or more non-significant characters. The special character gating signal is generated by a logic unit comprising an OR gate 65 and an AND gate 66. A signal from either AND gate $A_{2-0}$ or AND gate $A_{3-0}$ is supplied to one terminal of AND gate 66 through the OR gate 65 in response to detection of two or three non-significant characters by the control unit 18. The other terminal of the AND gate 66 is connected to the common signal line 56 of the transfer unit 19 through a delay unit 58S. The special character is therefore transferred to tape in sequence after transfer of the character contained in register 22*d* provided that the data in the register contained two or three non-significant characters.

If the word transferred into the temporary storage means 16 contains all zeros, the signal from AND gate $A_{4-0}$ supplies the special character gating signal to terminal 61*c*. Thus, if all the characters are non-significant, only the special character is transferred to tape. On the other hand, if the word contained in temporary storage has all significant characters or only one non-significant character, the entire word is transferred to tape 12. Since AND gate 66 is closed under these conditions, the special character gating signal is not generated and the special character is not entered onto tape 12.

An end-of-operation signal EO is obtained when the special character generator is operated by delaying the special character gating signal supplied to terminal 61*c* in a delay unit 67. When the character generator is not operated, i.e., when the data contains less than two non-significant characters, the end-of-operation signal is generated by means of an OR gate 68 and an AND gate 69. One terminal of the AND gate 69 is connected to the common signal line 56 while the other terminal is connected to the output terminal of OR gate 68 which is supplied with a signal from either of the AND gates $A_{0-0}$ and $A_{1-0}$.

The end-of-operation signal is employed first to reset each register 22 to a zero position and is therefore supplied to terminals 26 of all the FF units by means of a line 70 (see FIG. 1*a*). The end-of-operation signal is also supplied to line 33 of the gating unit 17 after being delayed a suitable length of time by a delay unit 71. The end-of-operation signal may also be employed after being delayed by a delay unit 72 as the control gate pulse for control unit 18.

The operation of the data compression system is generally as follows. A start signal SS applied to terminal 17*s* of gating unit 17 causes a word located in a predetermined data field of the input unit 10 to be transferred to the temporary storage unit 16. The control unit automatically determines the number of non-significant characters contained in the word. The start signal, after being delayed by delay unit 72, supplies a gate control signal to the control unit 18. Control unit 18 provides a signal corresponding to the number of non-significant characters in storage unit 16 to the transfer unit 19. The transfer unit 19 operating under control of this signal causes only the significant characters in storage unit 16 to be transferred to the main storage unit 11.

The signal from the control unit 18 also determines whether or not the special character generator is energized, depending upon the number of non-significant characters that have been dropped. The character generator thereafter supplies an end-of-operation signal EO which causes the cycle to repeat for the next word supplied by input unit 10.

The data processing system, as shown in FIGS. 5 and 5*a*, includes a data expansion system 115 which functions to replace nonsignificant characters in the information stored in compressed form in storage unit 111 as it is read out to the output unit 110. The output unit 110 is shown in block form in FIGS. 5 and 5*a* in that it may represent any suitable device such as an accounting card punching apparatus, a printer or the internal core matrix memory of a computer. The main storage unit 111 may be considered identical to the main storage unit 11 shown in FIGS. 1 and 1*a*.

The data expansion system comprising a stepping register 116, an auxiliary register 116*a*, a control unit 118 and a gating unit 117 which operates to transfer data contained in the stepping register 116 to the output unit 110 under the control of control unit 118. In operation, data is transferred from the main storage unit 111 to the auxiliary register 116*a* one character at a time. The control unit 118 provides a stepping signal to the stepping register 116 in response to the entry of a significant character into the auxiliary register 116*a* and a transfer out signal to the gate unit 117 in response to the entry of the special character into the register 116*a* or in response to the generation of a predetermined number of stepping signals. The control unit 118 also provides a reset signal to reset each of the registers to zero when an expanded word has been transferred to the output unit 110.

With reference to the embodiment of the invention shown in FIG. 5, the auxiliary register 116*a* comprises four bistable units, each of which has an input terminal 125, an output terminal 124 and a reset terminal 126. The input terminal 125 of each unit is connected to a different transducer through suitable amplifiers (not shown) so that characters recorded on tape 112 are entered into the auxiliary register 116*a* serially by character and parallelly by bit. A reset signal applied to the reset terminal 126 of the auxiliary register 116*a* causes each of the bistable units to be switched to the low state where the voltage of output terminal 124 is low. A binary "1" bit applied to input terminal 125 causes the associated output terminal 124 to be switched to its high state while a binary "0" bit maintains the bistable units in the low state where output terminals 124 are low. The four-stage register shown in FIG. 2 may be employed as the auxiliary register since terminals 124 provide signals complementary to the signals provided by terminals 24.

The output terminals 124 of the auxiliary register 116*a* are connected in parallel to the control unit 118 and the last stage of the stepping register 116. A four-stage stepping register is shown in FIG. 5. Since stepping registers are well known in the art, a detailed description of their structure and operation does not appear to be warranted. Generally, however, each stage comprises a four-bit register 122 and a gating unit 123. The registers are similar to the auxiliary register 116*a* and comprise four bistable units each of which includes an input terminal 125, an output terminal 124 and a reset terminal 126. A reset pulse applied to terminals 126 resets each bistable unit to a zero position where the voltage of output terminals 124 are low. A binary "1" signal applied to input terminal 125 causes the bistable unit to switch states, which renders terminal 124 high. A binary "0" signal applied to terminal 125 does not affect the condition of the bistable unit.

Each register 122 is connected to the next preceding register by means of a gating unit 123 identical to the gating unit shown in FIG. 3. One terminal of each AND gate of the gating unit is connected to the output terminal 124 of the succeeding register while the other terminals are connected in parallel to a step terminal 121 supplied with a step signal from the control unit 118. The output terminals of the AND gates are connected to the input terminals 125 of the preceding registers 122 so that a step signal supplied to terminal 121*s* causes the stepping register 116 to be stepped one position to the left.

The output terminals of the registers 122*a* through 122*d* are also connected to the output unit 110 through gating units 130*a* through 130*d* similar to the gating unit shown in FIG. 3. Gating units 130*a* through 130*d* operate in response to a transfer out signal supplied to line 133.

The transfer out signal and the step signal are provided by the control unit 118 in accordance with the entry of characters into the auxiliary register 116*a*.

The control unit 118, as shown in FIG. 5, comprises generally means for generating a step signal in response to the entry of a significant character into the auxiliary register, 116*a*, means for providing a transfer signal in response to the entry of the special character into the auxiliary register, and means for generating a transfer signal in response to a predetermined number of step signals which, in this instance, is four. The control unit 118 thereby functions to cause the data contained in the stepping register to be transferred to the output unit when the special character is entered into the auxiliary register or when the register has been stepped four times.

The means for generating a transfer out signal in response to the entry of the special character into the auxiliary register comprises an AND gate 150 having four input terminals 151 connected respectively to the output terminal 124 of the auxiliary register 116*a*. The output terminal 152 of AND gate 150 is in a high condition only when the special character, previously assumed to be defined by four binary "1" bits, is entered into the auxiliary register 116*a* and is in a low condition when a significant character is entered into the auxiliary register 116*a*.

The means for obtaining the step signal comprises an inverter 153 connected to the output terminal 152 of the all-1's AND gate 150. The step signal supplied from the inverter 153 is therefore obtained in response to the entry of a significant character into the auxiliary register since at least one of the bits in the auxiliary register will be a binary "0," causing the terminal 152 of the all-1's AND gate 150 to be in a low state.

The step signal from inverter 153 and the transfer out signal from the all-1's AND gate 150 are supplied to the stepping register 116 and the gating units 130, respectively, through timing AND gates 155 and 156 which are operated at appropriate times by a timing arrangement 157. Timing arrangement 157 comprises a multivibrator unit 158 having an input terminal 159 connected to the transducers 113*a* through 113*d* through a four-terminal OR gate 160. Since each number recorded on tape contains at least one binary "1," a signal supplied to the multivibrator each time a number is entered into the auxiliary register 116*a*. Where a significant zero has been recorded on tape, a signal is supplied to terminal 159 through inverter 160I. The multivibrator unit 158 may be a single-shot multivibrator which provides an output pulse for a predetermined length of time in response to an input signal to the terminal 159 and then returns to its normal state. Alternatively, the multivibrator unit may be a typical bistable flip-flop circuit having a reset terminal 162. The output terminal 161 of the multivibrator supplies a signal simultaneously to the timing AND gates 155 and 156 in response to a signal from the four-terminal OR gate 160 or from the inverter 160I.

A step signal S or a transfer signal T is thereby provided by one or other of AND gates 155 and 156. A delayed transfer signal TD is obtained by connecting a delay unit 165 to the output of the transfer signal AND gate 156. A delayed step signal SD is also obtained by connecting a similar delay unit 166 to the output of the step signal gate 155. The delayed step signal SD is employed to return the multivibrator 158 to a zero condition.

The transfer signal T from timing AND gate 156 is supplied to the gating units 130, which causes the four-character word stored in the stepping register 116 to be transferred to the output unit 110. The delayed transfer signal TD obtained at the output of delay unit 165 is employed to reset each of the registers 122*a* through 122*d*, the auxiliary register 116*a*, the multivibrator 158 and a counter 170 (whose function is explained later) to a zero condition.

The step signal S from the AND gate 155 is supplied to terminal 121*a* of the stepping register 116. Terminal 121*a* is connected to the reset terminal 126 of the register 122*a* through an OR gate 171 and the gating unit 123*a* through a suitable delay unit 172. Step signal S therefore causes the first register 122*a* to be set to a zero condition and immediately thereafter causes the contents of the second register 122*b* to be transferred to register 122*a*.

A plurality of delay units $D_2$, $D_3$, $D_4$ and $D_x$ are connected in series to the output of the step signal AND gate 155 in order to provide suitable stepping signals for the remaining stages of the register 116. Signal $SD_2$ obtained from delay unit $D_2$ is applied to terminal 121*b* of the register 122*b* after its contents have been transferred to register 122*a*. Terminal 121*b* is connected identically to terminal 121*a* so that the $SD_2$ signal applied thereto causes register 122*b* to be set to zero and, after a momentary delay, causes the contents of the third register 122*c* to be transferred to register 122*b*. Signal $SD_3$ applied to terminal 121*c* and signal $SD_4$ applied to terminal 121*d* cause characters to be transferred from register 122*d* to register 122*c* and from auxiliary register 116*a* to register 122*d*. The signal $SD_x$ is applied simultaneously to the reset terminal 126 of the auxiliary register 116*a* through an OR gate $171_x$ and to the counter 170. The auxiliary register is therefore conditioned to receive the next successive character from tape 112. Signal $SD_x$ applied to the input terminal 179 of the three-stage binary counter 170 provides an indication in the counter of the number of characters transferred to the stepping register 116 from the auxiliary register 116*a*. Counter 170 is arranged to provide a transfer signal T when four significant characters in succession are transferred to the stepping register 116, which represents a word which was not compressed prior to entry into the main storage unit 111. Counter 170 may therefore be considered as means for providing a transfer signal T in response to entry of a non-compressed word into the stepping register 116. As mentioned previously, the counter 170 is reset to zero in response to a delayed transfer signal TD applied to reset terminal 173.

The operation of the data expansion system shown in FIGS. 5 and 5*a* may be divided into two types of transfer operations, e.g., a transfer of a compressed word and a transfer of a non-compressed word. Assuming that the system is in a start condition wherein each of the registers is in a zero condition, the two types of operations proceed as follows.

The main storage unit 111 supplies characters to the auxiliary register 116*a* at a predetermined rate determined, in this instance, by the speed of the tape 112 relative to the transducers 113. Assuming that the first character entered into the auxiliary register is the special character defined by four binary "1's" the all-1's AND gate 150 supplies a signal to one terminal of the AND gate 156 while the timing arrangement 157 supplies a signal to the other terminal of AND gate 156. A transfer signal T is therefore generated by the control unit and applied to the line 133 of the gating unit 117. Since the registers 122*a* through 122*d* were set to a zero condition initially, a four-zero word is transferred to the output unit 110. The delayed transfer signal TD thereafter returns the system to its start condition.

If the next word recorded on tape 112 contains only two significant characters, the two significant characters have been recorded followed by the special character. In expanding this word the first character is entered into the auxiliary register 116*a* and a step signal S is generated by AND gate 155 in response to the output of the inverter 153 and a signal from timing arrangement 157. The step signal S transfers the contents of register 122*b* to register 122*a*. The delayed step signal SD resets the bistable unit 158 of the timing arrangement 157 while the step signals $SD_2$ and $SD_3$ cause the contents of registers 122c and 122d to be stepped to the left one register position. Step signal $SD_4$ transfers the contents of the auxiliary register 116a to register 122d. Step signal $SD_x$ resets the auxiliary register to zero and advances the counter 170 to a 1-count condition. The stepping register now contains three zeros and a significant character reading from left to right.

The entry of the second character into the auxiliary register 116a results in a similar series of operations so that, when completed, the stepping register contains two zeros and two significant characters and the counter is in a 2-count condition. The entry of the special character into the auxiliary register 116a results in a transfer signal T being generated by the control unit 118 in the manner previously described above. The two-character word is therefore transferred to the output unit 110 in expanded form. The delayed transfer signal TD thereafter returns the system to a start condition.

Assuming that the next word recorded on tape is one that was not compressed or, stated differently, is a word containing four significant characters, the transfer of each character into the stepping register 116 proceeds as described above. The step signal $SD_x$ generated for each character causes counter 170 to advance one count for each transfer. After transfer of the last character from the auxiliary register 116a to the register 122d, the step signal $SD_x$ advances the counter 170 to a 4-count condition, which causes generation of a transfer signal T by control unit 118. The four-character word contained in the stepping register 116 is therefore transferred to the output unit 110 and the delayed transfer signal TD resets the system to a start condition ready to operate on the next character entered into the auxiliary register 116a.

It should be noted that, where the main storage unit comprises a magnetic tape file for storing the information in compressed form as shown in FIG. 5, it is not necessary to start and stop the tape file for entry of each character. The tape file may be run continuously so that each character stored thereon is entered into the auxiliary register 116a, is expanded by the expansion system and is supplied to the output unit 110 which may be provided with suitable address selection circuits for selecting the words desired when they are supplied. The compression and expansion system operates with sufficient speed to handle the entry of characters into the auxiliary register at present day tape speeds, e.g. a 15 kilocycle character input rate.

It will thus be seen that a relatively simple and inexpensive compression and expansion system is provided by the above described arrangement which may be embodied between various types of units which function to process data.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for compressing a data word representation consisting of a fixed number of characters each of which is defined by binary data bits having equal time bases comprising in combination temporary storage means for storing each character of said data word, control means connected to said temporary storage means for providing control signals indicative of the number of non-significant characters contained in said data word, means connected to said temporary storage means operable in response to said control signals for serially transferring out only significant character representations of said data word, and means connected to said control means operable in response to a predetermined number of non-significant characters in said temporary storage means for transferring out a special character representation following the last significant character representation transferred.

2. A system for compressing a data word representation consisting of a fixed number of characters defined by binary data bits having equal time bases for entry into a main storage unit in compressed form comprising in combination an input unit, a multi-character register, a gating unit connected therebetween for controlling the entry of each character of a data word representation into said register, a control unit connected to said register for providing a plurality of control signals indicative of the number of non-significant character representations contained in said register, a transfer unit connected between said main storage unit and said register, a special character generator connected to said main storage unit for supplying a special character representation thereto, means for supplying said control signals to said transfer unit to cause transfer of only the significant character representations of said data word representation contained in said register, and means for supplying said control signals to said special character generator to cause operation thereof immediately following the transfer of the last significant said character representation when a predetermined number of said characters are transferred.

3. A system for expanding a compressed data word representation stored in a main storage unit to its original length of a predetermined number of character positions comprising an auxiliary register connected to said main storage unit for serial reception of character representations presented from said main storage unit, a multi-character stepping register connected to said auxiliary register, an output unit, gating means connected between said output unit and said stepping register, a control unit connected to said auxiliary register including first means for generating a step signal in response to entry of a significant character representation into said auxiliary register, second means for generating a transfer signal in response to entry of a predetermined character representation into said auxiliary register, and third means for generating said transfer signal in response to sequential entry of a predetermined number of significant character representations into said auxiliary register, means for supplying said step signals to said stepping register to cause said significant character representations to be entered therein serially from said auxiliary register, and means for supplying said transfer signal to said gating means to cause the contents of said stepping register to be transferred to said output unit.

4. In a system for processing data comprising data words each defined by a fixed group of binary coded character representations with each character representation having binary data bits of equal time bases, the combination comprising a main storage unit, an input unit, an output unit, a data compression system connected between said input unit and said main storage unit, and a data expansion system connected between said main storage unit and said output unit, said compression system including first means for storing each data bit of each character of a data word representation, gating-in means connected between said input unit and said first storage means for entering each data bit of each character of a data word representation therein, a control unit connected to said first storage means for providing control signals indicative of the number of non-significant character representations contained in said entered data word representation, gating-out means connected between said first storage means and said main storage unit, a special character generator, means connecting said control unit to said gating-out means to cause transfer of all data bits of only significant character representations to said main storage unit in response to said control signals, and means connecting said control unit to said special character generator to cause selective transfer of said special character representation following the last significant character representation transferred in accordance with the number of non-significant character representations not transferred.

5. In a system for processing data comprising data words each defined by a group consisting of a fixed number of binary coded character representations, the combination comprising a main storage unit, a data compression system for entering into said storage unit only the significant character representations of each said data word followed by a special character representation, an output unit, and a data expansion system, said expansion system comprising an auxiliary register connected to said main storage unit for reception of character representations presented serially from said main storage unit, a multi-character register connected to said auxiliary register, a control unit connected to said auxiliary register including first means for providing a first control signal in response to entry of a significant character representation into said auxiliary register, second means for providing a second control signal in response to entry of said special character representation into said auxiliary register and third means for providing said second control signal in response to sequential entry of a predetermined number of said significant character representations into said auxiliary register, first gating means associated with said registers for transferring character representations from said auxiliary register to said multi-character register in response to said first control signal, and second gating means connected between said output unit and said multi-character register for transferring the contents of said multi-character register to said output unit in response to said second control signal.

6. A data compression system comprising in combination means for temporarily storing a data word having a fixed plurality of characters each defined by binary coded indicia having equal time bases, means for entering said characters of said data word into said temporary storage means in parallel, a control means connected to said storage means for providing control signals indicative of the number of non-significant characters present in said entered word, a transfer unit connected to said storage means for serially transferring out the binary coded indicia of only significant characters of said entered word in response to said control signals, a special character generator, and means for supplying said control signals to said generator to cause said special character to be transferred following the last significant character transferred when the number of said non-significant characters is two or more.

7. A system for expanding a compressed data word having significant character representations and a special character representation to its original length of a fixed number of characters, said character representations comprising binary data bits each having the same time base comprising in combination a single character representation storage means adapted to receive character representations in serial form, a multi-character representation storage means connected thereto, a control unit connected to said single character storage means including first means for generating a first control signal in response to entry of a significant character into said single character storage means and a second control signal in response to entry of said special character representation into said single character storage means, and second means for providing said second control signal in response to a predetermined number of said first control signals, means for supplying said first control signals to said multi-character storage means to cause serial entry of said significant character representations from said single character storage means, a gating unit connected to said multi-character storage means, and means for supplying said second control signal to said gating unit to cause transfer of said character representations contained in said multi-character storage means through said gating unit.

8. A data compression system comprising in combination register means for storing a data word having a fixed plurality of characters defined by binary coded indicia which have the same time base, first gating means for entering a data word into said register means, control means connected to said register means for providing control signals indicative of the number of non-significant characters present in said entered word, second gating means connected between said register means and the output of said system for serially transferring out said binary coded indicia of only significant characters of said entered word in response to said control signals, means for generating a special character, and means operable in response to predetermined ones of said control signals which indicate two or more non-significant characters for supplying said special character to the output of said system in a fixed time relationship with said significant characters.

References Cited in the file of this patent

UNITED STATES PATENTS 2,853,698 Nettleton ------------- Sept. 23, 1958
2,934,746 Way Dong Woo -------- Apr. 26, 1960